United States Patent [19]

Weissfloch

[11] Patent Number: 5,693,276

[45] Date of Patent: Dec. 2, 1997

[54] METHOD FOR EXTRUDING SYNTHETIC WELDING MATERIAL, AS WELL AS A WELDING DEVICE FOR WELDING SYNTHETIC MATERIAL FOR CARRYING OUT THIS METHOD

[75] Inventor: Reinhard Weissfloch, Stolberg, Germany

[73] Assignee: Wegener GmbH, Germany

[21] Appl. No.: 546,580

[22] Filed: Oct. 20, 1995

[51] Int. Cl.$^6$ ................ B29C 47/10; B29C 65/40
[52] U.S. Cl. ............. 264/140; 264/176.1; 264/349; 425/87; 425/202; 425/305.1; 425/458; 156/500
[58] Field of Search ................ 264/176.1, 349, 264/141, 148; 156/118, 140, 244.11, 500; 425/87, 202, 206, 207, 458, 315, 316, 305.1

[56] References Cited

U.S. PATENT DOCUMENTS

| | | | |
|---|---|---|---|
| 2,556,609 | 6/1951 | Arkless | 425/458 |
| 3,264,688 | 8/1966 | McIlvin | 425/202 |
| 3,517,095 | 6/1970 | Dunnington et al. | 264/349 |
| 3,953,006 | 4/1976 | Patacity et al. | 425/87 |
| 4,289,552 | 9/1981 | Hammer | 264/73.4 |
| 4,377,429 | 3/1983 | Struve | 156/244.11 |
| 4,961,895 | 10/1990 | Klein | 264/40.6 |
| 5,153,008 | 10/1992 | Koch | 425/202 |

FOREIGN PATENT DOCUMENTS

| | | | |
|---|---|---|---|
| 0364701 | 8/1989 | European Pat. Off. | |
| 0637497 | 4/1994 | European Pat. Off. | |
| 2142689 | 3/1972 | Germany. | |
| 2258197 | 5/1974 | Germany | 425/202 |
| 2823171 | 11/1979 | Germany. | |
| 3221492 | 2/1984 | Germany. | |
| 86121308 | 5/1986 | Germany. | |
| 3616296 | 11/1987 | Germany. | |
| 3808723 | 6/1989 | Germany. | |
| 3835250 | 5/1990 | Germany. | |
| 93117051 | 8/1993 | Germany. | |
| 62-128710 | 6/1987 | Japan. | |
| 62-199408 | 9/1987 | Japan. | |

Primary Examiner—Jeffery R. Thurlow
Attorney, Agent, or Firm—Joseph W. Berenato, III

[57] ABSTRACT

A method for extruding synthetic welding material using a welding device for synthetic welding material for the purpose of producing welding seams is characterized by the following features:

a) A plastic wire is drawn by a feed device into the welding device (11, 12, 38) for synthetic welding material;

b) The plastic wire is fed by the feed device (11, 12, 38) with a specific advancement into a cutting device (26, 36) of the welding device for synthetic welding material;

c) In the cutting device (26, 36), pieces are cut consecutively from the plastic wire while forming essentially even cutting surfaces;

d) The advancement of the plastic wire and the cutting frequency of the cutting device (26, 36) are in such a ratio to each other that the cut-off length of the pieces is in the same magnitude as the mean diameter of the plastic wire;

e) The pieces are then heated until they are plastified;

f) The plastified synthetic material is ejected as synthetic welding material from the welding device for synthetic welding material.

19 Claims, 2 Drawing Sheets

METHOD FOR EXTRUDING SYNTHETIC WELDING MATERIAL, AS WELL AS A WELDING DEVICE FOR WELDING SYNTHETIC MATERIAL FOR CARRYING OUT THIS METHOD

FIELD OF THE INVENTION

The invention relates to a method for extruding synthetic welding material using a welding device for synthetic welding material in order to produce welding seams. The invention also relates to a welding device for synthetic welding material for carrying out this method.

BACKGROUND OF THE INVENTION

Such welding devices for synthetic welding material are used for welding plastic plates or similar materials. They consist essentially of a hand drill which functions as a drive and an attachment placed onto it in such a manner as to be removable. In the attachment, a plastic strand in the form of a plastic wire, which has been fed via a feed channel—several feed channels may also have been provided—and a feed device, is cut into pieces. The pieces are then heated in a feed device constructed in most cases as a feed worm and in a plastification device in such a manner that the cut plastic material is then transformed into a plastic state and is ejected via a welding shoe as a continuous synthetic welding material.

DE-OS 28 23 171 discloses a welding device for synthetic welding material in which the plastic wire is fed by the feed device to a special cutting device. This cutting device has a number of impact bars which are arranged over the periphery on the mantle of the feed worm in the input area so as to project radially outward. The impact edges hereby extend parallel to the rotation axis of the feed worm and sweep over an opening of the feed channel in a housing mantle enclosing the cutting device while they rotate—driven by the hand drill.

The previously known cutting device creates problems when cutting plastic wire. The cutting device capacity is, for example, necessarily small because only one path is provided for transporting the plastic wire between the two impact bars, said path corresponding approximately to the level of the impact bars. In addition, the further transport of the pieces is not sufficiently ensured, since the spaces between the individual impact bars are not connected to the worm threads of the feed worm.

Another significant disadvantage is that the part of the plastic wire fed into the cutting device is not cut off cleanly but instead is chopped off. The reason for this is that the impact edges in such a cutting device may not be brought close enough to the enclosing housing mantle to allow the feed worm sufficient play for bending. But since the plastic wire is a relatively viscous material, the chopping off of the ends projecting beyond the opening results in incomplete separations and twisting of the plastic wire inside the feed channel, in particular in the area of the opening of the feed channel. This again results in malfunctions in the feeding of the plastic wire and thus finally in a standstill of the device, something which is particularly disadvantageous for a straight welding process.

It is because of these reasons that a welding device for synthetic welding material of the type mentioned in DE-OS 28 23 171 has not reached the market. In a further development of the welding device for synthetic welding material, the applicant of DE-OS 28 23 171 eliminated the problematic cutting device (DE-PS 32 21 492). In this welding device for synthetic welding material, the plastic wire is fed uncut to the feed worm of the feed device and is cut there by the feed worm itself. The feed device here is a feed roller connected in one piece on the input side to the feed worm, said feed roller having on its periphery a thread-like profile, whereby the feed channel is guided in a partial section parallel to the rotation axis of the feed roller, and is designed so as to be open towards it, i.e. in such a way that the profile is able to dig itself into the external mantle of the plastic wire.

It was found that even this solution is unable to achieve a clean cutting off of the plastic wire ends introduced into the feed channel. The cut-off lengths of the plastic wire are very uneven, with the result that the plastified plastic strand exiting the mouthpiece of the welding device for synthetic welding material is inhomogeneous. This again diminishes the quality of the welding seam.

In order to achieve an improvement to this effect, it has been suggested in DE-OS 38 35 250 to feed the plastic wire to the feed device, which is also constructed as a profiled feed roller in such a manner that the plastic wire is at least already pre-cut by the worm-like profile of the feed roller.

The fact that the profile of the feed roller must fulfill both a feeding and a cutting function again prevents a clean cutting of the plastic wire. The problem of inhomogeneity and thus finally of the welding quality is therefore still not satisfactorily solved, even with this embodiment of a welding device for synthetic welding material.

SUMMARY OF THE INVENTION

The invention is therefore based on the task of designing a method for extruding synthetic welding material in such a way as to ensure the ejection of a homogenous, plastified plastic strand. Another part of the task consists of providing a welding device for synthetic welding material for carrying out this method.

The first task is solved according to the invention with the following characterizing features:

a) A plastic wire is drawn by a feed device into the welding device for synthetic welding material;

b) The plastic wire is fed by the feed device with a specific advancement into a cutting device of the welding device for synthetic welding material;

c) In the cutting device, pieces are cut consecutively from the plastic wire while forming essentially even cutting surfaces;

d) The advancement of the plastic wire and the cutting frequency of the cutting device are in such a ratio to each other that the cut-off length of the pieces is in the same magnitude as the mean diameter of the plastic wire;

e) The pieces are then heated until they are plastified;

f) The plastified synthetic material is ejected as synthetic welding material from the welding device for synthetic welding material.

It was found that when using these steps, especially the measures according to characteristics c) and d), a homogenous, plastified plastic strand is created, even if the plastic wire consists of a relatively viscous material. By cutting while forming essentially even cutting edges and by adapting the length of the pieces to the mean diameter of the plastic wire, granular, pourable pieces are created which can be easily fed to the plastification device without the risk of their melting together. This results in a homogenous, plastified plastic strand.

The same magnitude of length of the pieces and mean diameter of the synthetic material here means that one dimension should not be a multiple of the other dimension. It is preferred that the cut-off length of the pieces is essentially identical to the diameter of the plastic wire. The pieces should hereby be cut essentially vertical to the longitudinal axis of the plastic wire, since this will result in particularly compact pieces.

A further development of the invention provides that the pieces are cut off using one or more knives and a cooperating counter-knife. This design results in particularly clean cutting edges.

The second part of the task is solved according to the invention by a welding device for synthetic welding material with the following characteristic features:

a) The welding device for synthetic welding material has a feed device with a feed channel for the plastic wire;

b) The feed channel ends via an opening in a cutting device for the cutting of the plastic wire into pieces;

c) The cutting device has a knife element which can be rotated about a knife axis;

d) The knife element has at least one knife with a cutting edge;

e) The rotation surface created by the cutting edge(s) during the rotation of the knife element intersects with the knife rotation axis, with its extension directed towards the knife rotation axis;

f) At least one part located in the opening area of each feed channel is constructed as a counter-knife;

g) The advancement of the plastic wire generated by the feed device and the torque of the knife element are in such a relation to each other that the length of the pieces cut off the plastic wire is in the same magnitude as the mean diameter of the plastic wire, and it is preferably essentially identical to the diameter of the plastic wire;

h) The cutting device is followed by a feed and plastification device for plastifying the pieces and for ejecting the plastified synthetic welding material.

By using this welding device for synthetic welding material, the method according to the invention can be performed so that in the cutting device pieces are created which have a granular character and, in relation to the volume, a small surface. The pieces can be easily processed in the following feed and plastification device and can be plastified into a homogeneous strand of synthetic material. The welding device for synthetic welding material according to the invention is characterized by high reliability, since it does not have a tendency to clog, etc., because of the special formation of pieces.

The cutting device has been designed in such a way here that the knife element can be guided by a simple, axial adjustment as close as desired to the opening of the feed channel or the openings of the feed channels, so that the opening, or openings respectively, act(s) as counter-knife, i.e. knife and counter-knife bring about a clean cutting process, such as in a pair of scissors. During tests it was found that in spite of its viscous consistency, the plastic wire can be divided into always identical pieces without causing problems in the feeding of the plastic wire in the feed channel. This again results in a significant improvement in homogeneity, and ultimately in welding quality. There are practically no longer any operational interruptions due to the cutting process.

The implementation of the basic concept of the invention can be accomplished in a variety of ways. It would be conceivable, for example, that the cutting edge(s), as a result of an appropriately angled position relative to the knife rotation axis, create a rotation surface which forms a frustoconical mantle. But simpler in terms of production technology is a design in which the rotation surface is a plane which is vertical to the knife rotation axis, especially since the counter-knife or the counter-knives are then also constructed as planes which are vertical to the knife rotation axis. In addition, this creates particularly level cutting surfaces with clean edges. In order to achieve high cutting performance, it is recommended that the knife element is provided with a number of knives, for example with radially extending cutting edges in the manner of a star knife.

According to another feature of the invention, it is provided that the feed device is provided with a feed roller rotating about a roller rotation axis, and the feed channel(s) extend(s) in the area of the feed roller at least partially over a part parallel to the roller rotation axis and is (are) open towards the feed roller, and that the feed roller is provided with a profile extending into the feed channel(s) and bringing about a feeding movement of the plastic strand, for example in the form of at least one helical feed land or several feed lands which extend in a multi-threaded design. This design of the feed device, which is known per se from DE-PS 32 21 492, allows for a particularly compact and slim design of the welding device for synthetic welding material. The pitch of the feed land(s) should hereby be in such a relation to the torque of the knife elements that the length of the pieces cut off the plastic wire is in the same magnitude as the mean diameter of the plastic wire, and preferably should be essentially identical to it.

According to another characteristic, it is useful that the feed channel(s) each change at a distance to the counter-knife into a closed section which extends up to the associated counter-knife. In this way the plastic wire is enclosed on all sides in the area of the cutting device and is guided without problems, thus resulting in a clean cut in the cutting device.

The above described design can be eliminated if the cutting edges of the knives are oriented so that they create a cutting pressure directed outward at an angle. This ensures that even if no closed section is provided, the cutting forces always act against a wall of the feed channel(s), thus resulting in a clean cut. This solution is easier in terms of production technology.

In a further embodiment of the invention, it is provided that the knife element is attached at the output end of the feed roller. If the feed device is provided with a feed worm rotating about a worm rotation axis, the knife element can be attached coaxially at the output end of the feed worm. According to a particularly preferred embodiment, feed roller and feed worm are arranged coaxially to each other and connected with each other so as to be non-rotating, whereby the knife element is arranged, in particular clamped, between them.

And finally, it is provided according to the invention that each knife of the knife element has a bevel on the side facing the opening of the feed channel(s), said bevel facing away from the rotation direction of the knife element when seen from the opening, whereby the angle of this bevel towards the rotation surface is in such a relationship to the advancement of the plastic wire created by the feed device that the knife which sweeps over the opening of the feed channel in each case does not impede the ejection of the plastic wire from the feed channel. This measure is implemented in order to prevent clogging in the area of the feed and cutting device and to create clean cutting surfaces.

BRIEF DESCRIPTION OF THE DRAWINGS

The drawing shows a detailed illustration of the invention in reference to an exemplary embodiment.

DESCRIPTION OF THE INVENTION

Figure 1:
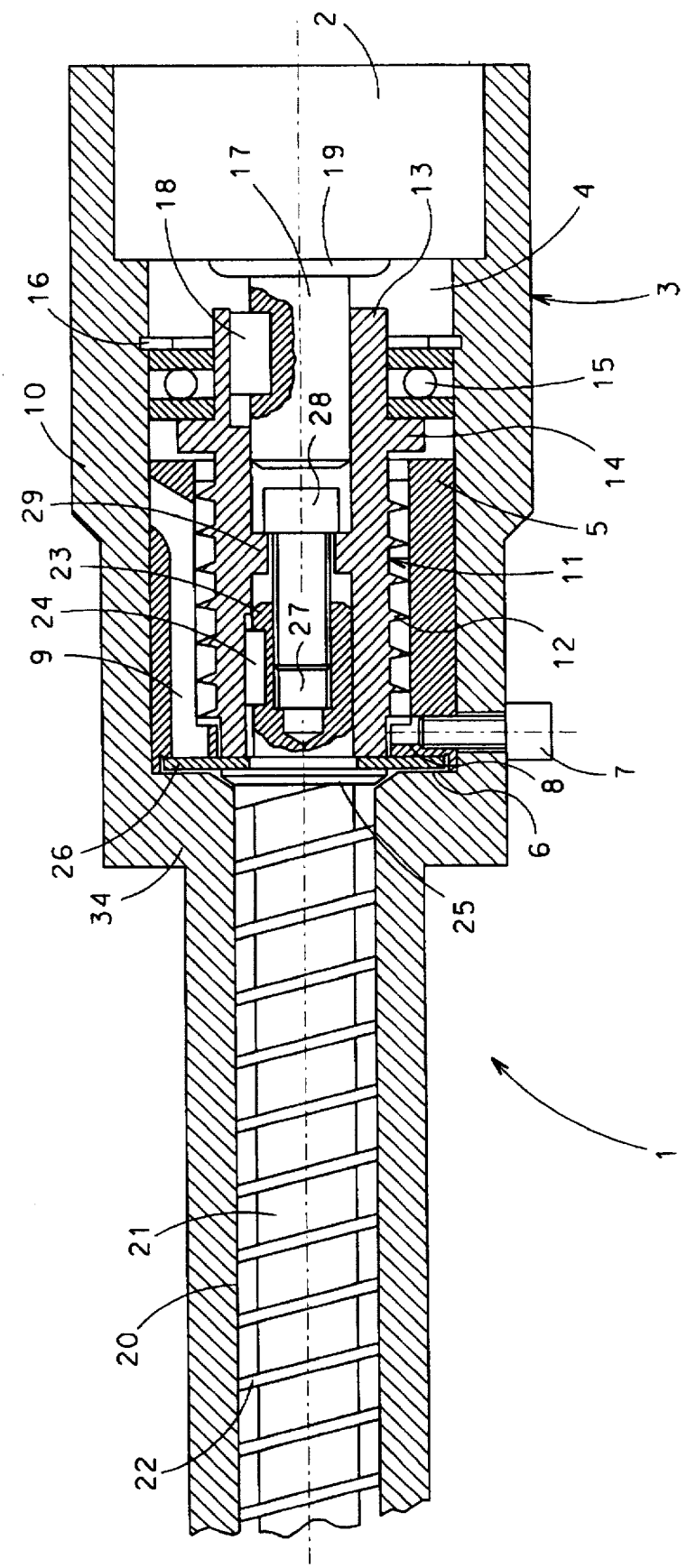
FIG. 1 shows a partial longitudinal section through an attachment device for a welding device for synthetic welding material.

FIG. 1 shows part of a welding device for synthetic welding material, i.e. only the attachment device 1 which is attached to a hand drill. For this purpose, the attachment device 1 has, in this view on the right, a receptacle bore 2 into which the drill head of the hand drill can be snugly fitted. The receptacle bore 2 is located in a housing 3 which is stepped several times, and wherein each of these steps is cylindrical.

The housing 3 is provided right after the receptacle bore 2 with a reduced axial bore 4 into which a cylindrical insertion sheath 5 up to a ring shoulder surface 6 terminates the axial bore 4. The insertion sheath 5 is fixed in place with a screw 7 which extends radially through the housing 3 and engages with the insertion sheath 5. The internal surface of the insertion sheath 5 is stepped, i.e. the internal surface has a greater diameter over most of its area than in an end section 8 which adjoins the ring shoulder surface 6. In the upper part, the insertion sheath extends through an axially extending section of a feed channel 9. It is open towards the ring shoulder surface 6 and has such a diameter that it is tubular in the end section 8 of the insertion sheath 5, but is open towards the inside in the part following in the direction of the receptacle bore 2. At the end of the open part, the feed channel 9 curves at an angle upward and continues in an angled bore 10 which penetrates through the housing 3.

A feed roller 11, whose mantle is surrounded by a worm land 12 with a cross-section in saw teeth-shape, extends in the insertion sheath 5. The worm land 12 reaches up to the inside wall of insertion sheath 5 and thus also projects into the open area of feed channel 9. The feed roller 11 has a bearing section 13 which projects outward towards the receptacle bore 2 and supports itself with a ring land 14 on an axial ball bearing 15. The latter is again positioned on a support ring 16 set into the inside wall of housing 3.

A drive shaft 17 projects into an axial bore of the feed roller 11 and is connected via a feather key 18 in a non-rotating manner with the bearing section 13 of the feed roller 11. The drive shaft 17 has a flange 19, by which it can be connected to a drill head of the hand drill.

The axial bore 4 in housing 3 is followed by a worm bore 20 which narrows around the ring shoulder surface 6 and which is located coaxially to the axial bore 4 or the receptacle bore 2. The worm bore 20 changes into a mouthpiece (not shown here in detail). A feed worm 21 is arranged in the worm bore 20, said feed worm being provided with a worm land 22. The feed worm 21 has an extension which projects into a bore of the feed roller 11, said extension being connected in a non-rotating manner via a feather key 24 with the feed roller 11.

At the input end, the feed worm 21 has a radially outward projecting support ring land 25. A knife element 26 has been clamped between the support ring land 25 and the opposing end face of the feed roller 11. The clamping is achieved in that the extension 23 has a threaded bore 27 which is open towards the free end and which engages via its threaded bore with a tension screw 28 whose head is supported on the ring land 29 projecting from the inside of the feed roller 11. By tightening tension screw 28, the extension 23 and thus the feed worm 21 is pulled towards the end face of the feed roller 11 and in this way clamp the knife element 26 between the support ring land 25 and the opposing end face of the feed roller 11.

The knife element 26 has such a radial extension that it sweeps almost the entire end face of the insertion sheath 5, and here in particular the opening of the feed channel 9. The fixation of the insertion sheath 5 and the axial support of the feed roller via the axial ball bearing 15 or the support ring 16 are hereby adapted to each other in such a way that the knife element 26 rests approximately at the respective end face of the insertion sheath 5, or so that only little play exists between the two.

Figure 2:
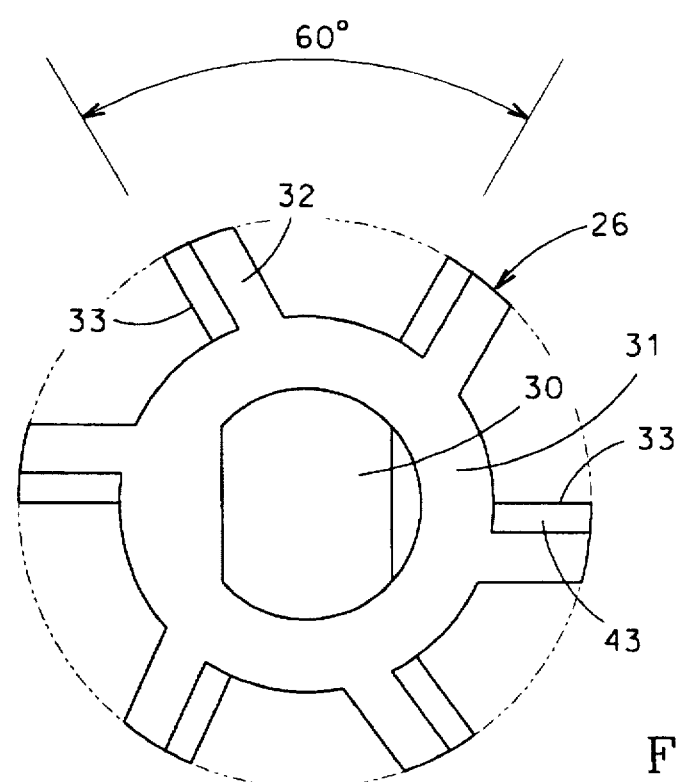
FIG. 2 shows a top view onto a knife element of the welding device for synthetic welding material according to FIG. 1.
Figure 3:
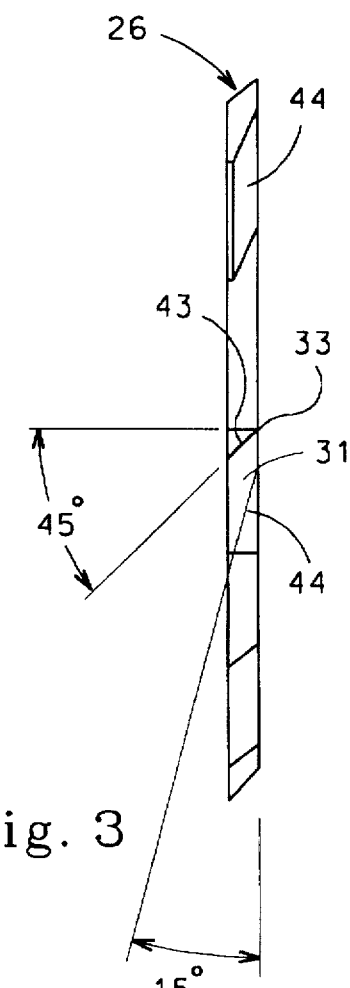
FIG. 3 shows a side view of the knife element according to FIG. 2.

The exact design of the knife element 26 can be seen from FIGS. 2 and 3. The knife element 26 has a non-circular center opening 30, by which the knife element 26 is positioned on a section of the extension 23 adapted to this shape, so that both are connected with each other in a non-rotating manner. The center opening 30 is surrounded by a ring section 31 from which a total of six outwardly directed knives—designed for example as 32—originate. In the intended rotation direction, the knives 32 each are provided with a cutting edge—designated for example with 33. The cutting edges 33 extend radially to the center or to the knife rotation axis of the knife element 26. The cutting edges 33 are followed by two cutting bevels each—for example designated as 43—which rise, when seen against the rotation direction of the knife element, i.e. by 45 degrees to the rotation axis of the knife element 26 (FIG. 3). The cutting bevels 43 are hereby located on the side facing away from the feed worm 21.

On the side facing the feed worm, the knives 32 each have a bevel—designated, for example, with faces away from the feed roller 11 against the rotation direction of the knife element 26, i.e. by an angle of 15 degrees to the rotation plane of the knife element 26. This angle is greater than the pitch of the worm land 12 on the mantle of the feed roller 11. As a result, the ejection of the plastic wire immediately following the cutting of the pieces is not hindered by the respective knife 32, since the bevel 44 causes the distance of the knife 32 to increase faster when sweeping over the opening of the feed channel 9 than the ejection of the plastic wire from this opening takes place.

To operate the welding device for synthetic welding material, the attachment 1 is connected to a hand drill by setting the latter's drill head into a receptacle bore 2 and by coupling it with the drive shaft 17. In addition, a heating device, not shown in detail here, is actuated; this heating device is attached to the section of the worm bore 20 or the feed worm 21 (not shown). Then a plastic wire is introduced into the feed channel 9 via the angled bore 10.

By switching on the hand drill, the drive shaft 17, feed roller 11, extension 23, and thus feed worm 21, as well as the knife element 26 are brought to rotate. The rotation direction is hereby such that the worm land 12 develops a feeding action towards the feed worm 21, i.e. the plastic wire introduced into the feed channel 9 is fed in the direction towards the tubular end section of the feed channel 9 in that the worm land 12 digs itself with its tips into the mantle of the plastic wire.

In the area of the knife elements 26, cylindrical pieces are cut by the knife 32, which follows in peripheral direction, off the plastic wire after the latter has exited between two rotating knives 32 from the feed channel. The opening of the feed channel 9 in the end face of the insertion sheath 5 hereby acts as a counter-knife. The number of knives 32 is hereby in such a relation to the pitch of the worm land 12 on the feed roller 11, and thus to the advancement of the plastic wire, that the length of the cut-off pieces corresponds to the mean diameter of the plastic wire—in round plastic wire to the latter's diameter. This results in granular pieces with a surface that is small relative to the volume.

The synthetic material which has been cut into pieces in this manner then passes via an angled recess 34 in the housing 3 into the area of the feed worm 21 and is fed by the latter towards the left in the shown view. Based on the friction occurring hereby, the cut pieces of the synthetic material are heated, whereby the heating is forced in the following heating device (not shown here) to such a point that the synthetic material becomes plastic and is transformed into a homogenous, plastified plastic strand. This strand is then ejected continuously from the mouthpiece of the attachment device 1 and forms the welding material for the objects to be welded.

Figure 4:
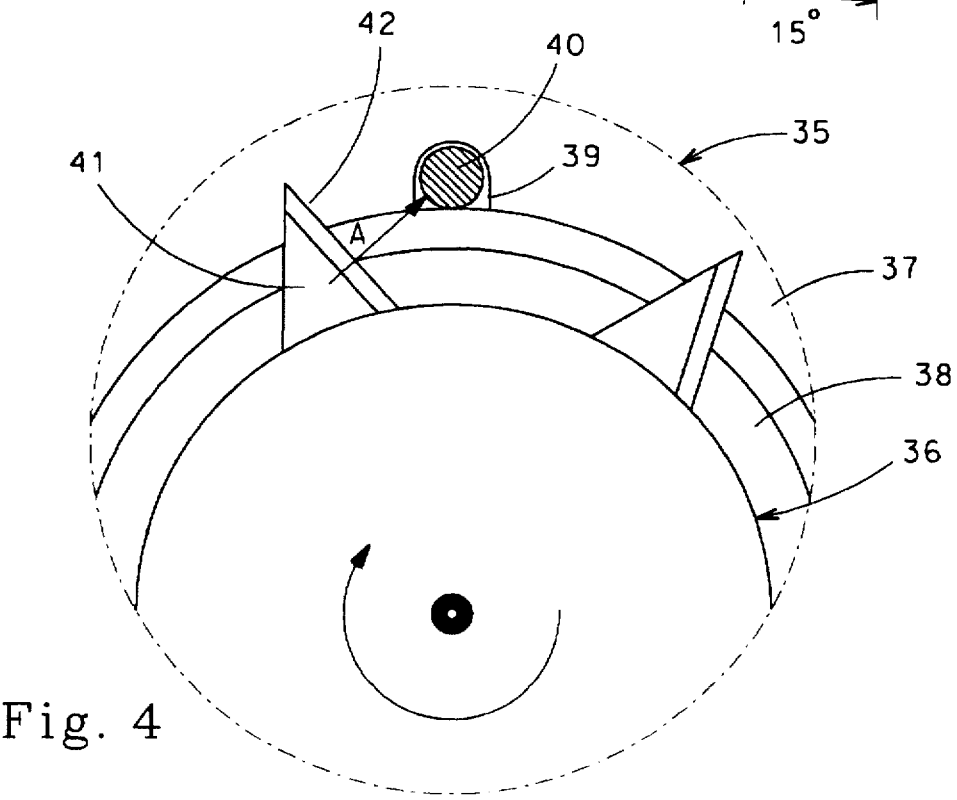
FIG. 4 shows a top view onto another knife element.

FIG. 4 represents a cross-section through another attachment device 35, with a view onto a knife element 36 in the foreground, as well as an insertion sheath 37 and a feed roller 38 in the background. The insertion sheath 37 hereby passes through a U-shaped feed channel 39 which is open towards the bottom in the direction of the feed roller 38, and in which feed channel 39 a plastic wire 40 is situated.

The knife element 36 has radially outward projecting knives—designated for example with 41—which have a triangular shape. Their cutting edges—designated for example with 42—extend in difference to the embodiment of FIGS. 2 and 3 not radially, but at an angle to the radial direction in such a manner that the vertical is directed angled outward towards the cutting edges 42. In this way a correspondingly outward cutting pressure, symbolized by arrow A, acts on the plastic wire 40. The plastic wire 40 is hereby supported fully in this direction by the inside of the feed channel 39. The feed channel 39 in this case must not be closed off towards the bottom.

I claim:

1. Method of extruding synthetic welding material from a welding device in order to produce welded seams, comprising the steps of:
   a) drawing plastic wire into a welding device;
   b) feeding the drawn-in plastic wire into a cutting device within the welding device;
   c) cutting within the cutting device consecutive plastic wire pieces having substantially even cut surfaces, the feeding of the plastic wire and the cutting frequency of the cutter device being synchronized so that the length of the cut pieces is of the same order of magnitude as the mean diameter of the plastic wire;
   d) heating the cut pieces until plastified; and
   e) ejecting the plastified material from the welding device.

2. The method of claim 1, including the step of:
   a) cutting the plastic wire generally transverse to the longitudinal axis thereof in order to form the plastic wire pieces.

3. The method of claim 1, including the step of:
   a) cutting the plastic wire with at least a first knife and a cooperating counter-knife.

4. The method of claim 3, including the step of:
   a) rotating the knife on an axis extending parallel to the longitudinal axis of the plastic wire.

5. Welding device for extruding synthetic plastic material in order to produce welding seams, comprising:
   a) a feed device into which plastic wire is fed, said feed device includes a feed channel having an opening and through which the plastic wire extends;
   b) a cutting device cooperating with said feed device opening and with which plastic wire is cut, said cutting device includes a knife having a cutting edge and said knife rotatable about an axis so that said cutting edge creates a rotation surface intersecting the axis of rotation of said knife;
   c) a counter-knife positioned within said opening in operable association with said knife;
   d) means cooperating with said knife and said feed device for cutting the plastic wire into pieces, said means for cutting assuring that the plastic wire pieces have a length of the same order of magnitude as the mean diameter of the plastic wire; and
   e) a plastification device downstream of and in flow communication with said cutting device for heating the plastic wire pieces to at least the plastification temperature and for thereafter ejecting the plastified material.

6. The device of claim 5, wherein:
   a) said means for cutting are operable in response to advancement of the plastic wire though said feed device and the torque of said knife.

7. The device of claim 6, wherein:
   a) said means for cutting causes the plastic wire pieces to have a length substantially equal to the diameter of the plastic wire.

8. The device of claim 5, wherein:
   a) said rotation surface extends generally transverse to the axis of rotation of said knife.

9. The device of claim 5, wherein:
   a) there are a plurality of cutting edges extending about said knife.

10. The device of claim 5, wherein said feed device includes:
    a) a feed roller rotatable about a roller rotation axis;
    b) said feed channel has a portion extending parallel to and opening toward said roller rotation axis; and
    c) said feed roller has a profile extending into said portion for causing advancement of the plastic wire.

11. The device of claim 10, wherein:
    a) said profile has at least one helical feed land.

12. The device of claim 11, wherein:
    a) said feed land includes a multi-threaded configuration.

13. The device of claim 11, wherein:
    a) the pitch of said feed land is related to the torque of said knife.

14. The device of claim 10, wherein:

a) said knife is attached to an end of said feed roller.

15. The device of claim 5, wherein:

a) said feed channel has a portion with a closed construction.

16. The device of claim 5, wherein:

a) there are a plurality of cutting edges, and said cutting edges cooperate to generate an outwardly angled cutting pressure.

17. The device of claim 10, wherein:

a) said plastification device includes a feed worm, and said feed worm is secured coaxially to said feed roller; and b) said knife is interposed between said feed worm and said feed roller.

18. The device of claim 17, wherein:

a) said knife is clamped between said feed worm and said feed roller.

19. The device of claim 5, wherein:

a) said knife has a bevel extending along a surface adjacent said opening, said bevel extending at an angle sufficient to permit plastic wire to be ejected from said feed channel.

* * * * *